United States Patent
Inoue et al.

(10) Patent No.: US 6,367,191 B1
(45) Date of Patent: *Apr. 9, 2002

(54) **METHOD OF SAWDUST-BASED CULTIVATION OF SHIITAKE (*CORTINELLUS SHIITAKE*) AND A CULTIVATION WATER TANK USED FOR THE METHOD**

(75) Inventors: Sadayuki Inoue; Sumio Ayusawa; Katsumasa Eda, all of Mibu-machi (JP)

(73) Assignee: Kabushiki Kaisha Hokken, Tochigi Prefecture (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,094

(22) Filed: Oct. 26, 1999

(51) Int. Cl.[7] .......................... A01G 1/04; A63B 69/10; A63B 69/12
(52) U.S. Cl. ...................... 47/1.1; 435/254.1
(58) Field of Search .................. 47/1.1, 58.1, 60; 435/254.1

(56) References Cited

U.S. PATENT DOCUMENTS

| | | | | |
|---|---|---|---|---|
| 4,027,427 A | * | 6/1977 | Stoller et al. | 206/439 |
| 4,542,608 A | * | 9/1985 | Tan | 47/1.1 |
| 4,646,466 A | * | 3/1987 | Olah | 47/1.1 |
| 4,878,312 A | * | 11/1989 | Shimizu | 47/1.1 |
| 4,987,698 A | * | 1/1991 | Tan | 47/1.1 |
| 5,370,714 A | * | 12/1994 | Ogawa et al. | 47/1.1 |
| 5,590,489 A | * | 1/1997 | Hattori et al. | 47/1.1 |

FOREIGN PATENT DOCUMENTS

| | | | | |
|---|---|---|---|---|
| GB | 2028082 A | * | 8/1979 | 47/1.1 |
| GB | 2043420 A | * | 2/1980 | 47/1.1 |
| IT | 0085928 | * | 2/1983 | 47/1.1 |
| JP | 3201911 | * | 3/1991 | |
| JP | 10-271913 | | 10/1998 | |

* cited by examiner

Primary Examiner—Charles T. Jordan
Assistant Examiner—Judith A. Nelson
(74) Attorney, Agent, or Firm—Wenderoth, Lind & Ponack, L.L.P.

(57) ABSTRACT

A method of sawdust-based cultivation of Shiitake (Cortinellus Shiitake) and a cultivation water tank used for the method in which a top portion of a cultivation bag which includes a cultivation bed (sawdust-based substrate) is cut to expose a top surface of the cultivation bed and water is poured into a gap between the bag and bed; and a cultivation water tank comprises a framework, water tanks arranged in the framework, sawdust-based substrates arranged in the water tank, a latticed frame, water sprinklers, an air blower and illuminators, a pump connected to the water pipe and the exhaust pipe through a pipe, exhaust pipes provided at a drain pipe so that water may not overflow onto the top surface of the sawdust-based substrates which is characterized in that water is circulated to refrain mushrooms from fruiting and growing from the side and bottom faces of the sawdust-based substrates, but to grow only from the top surface of sawdust-based substrates.

8 Claims, 5 Drawing Sheets

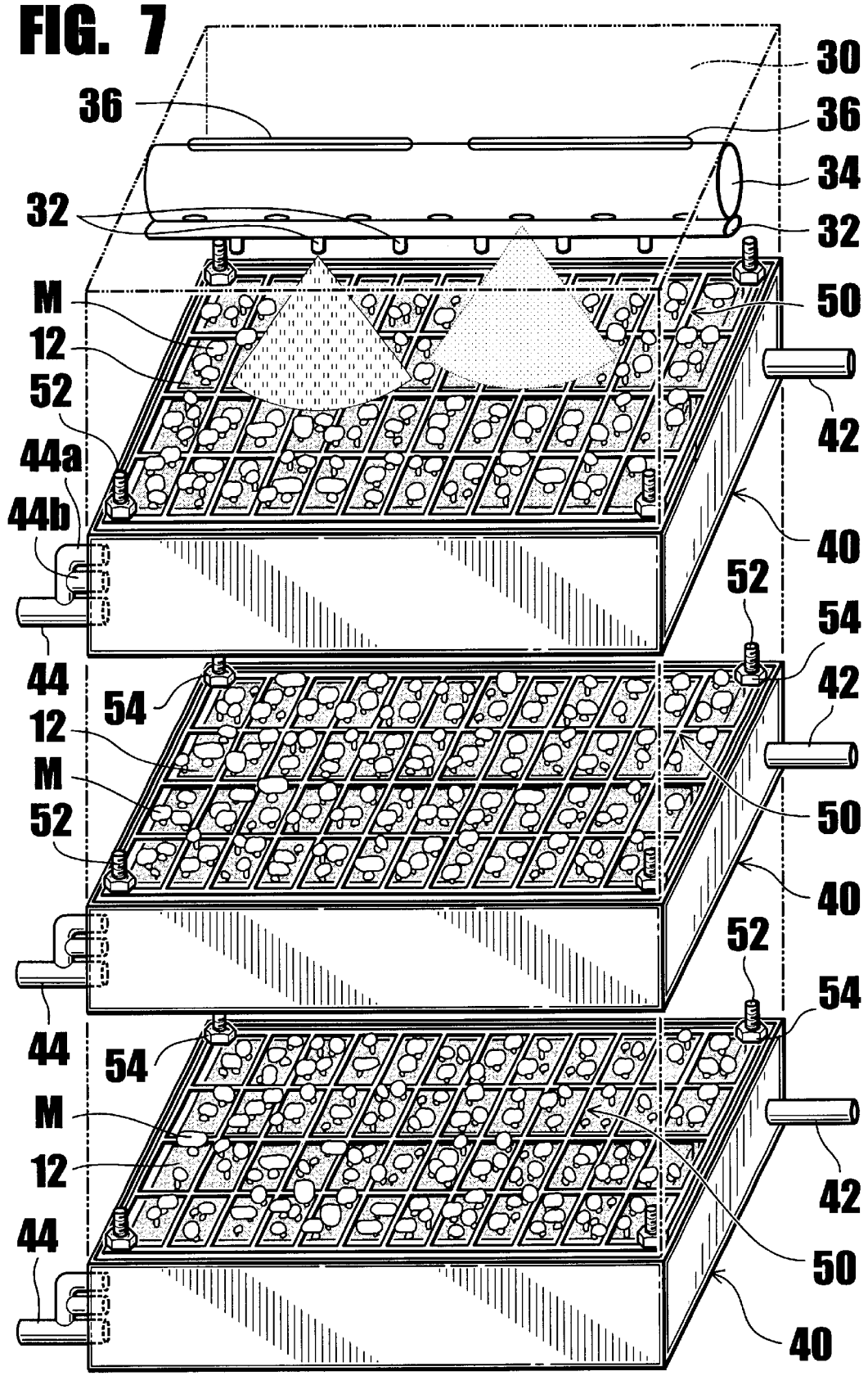

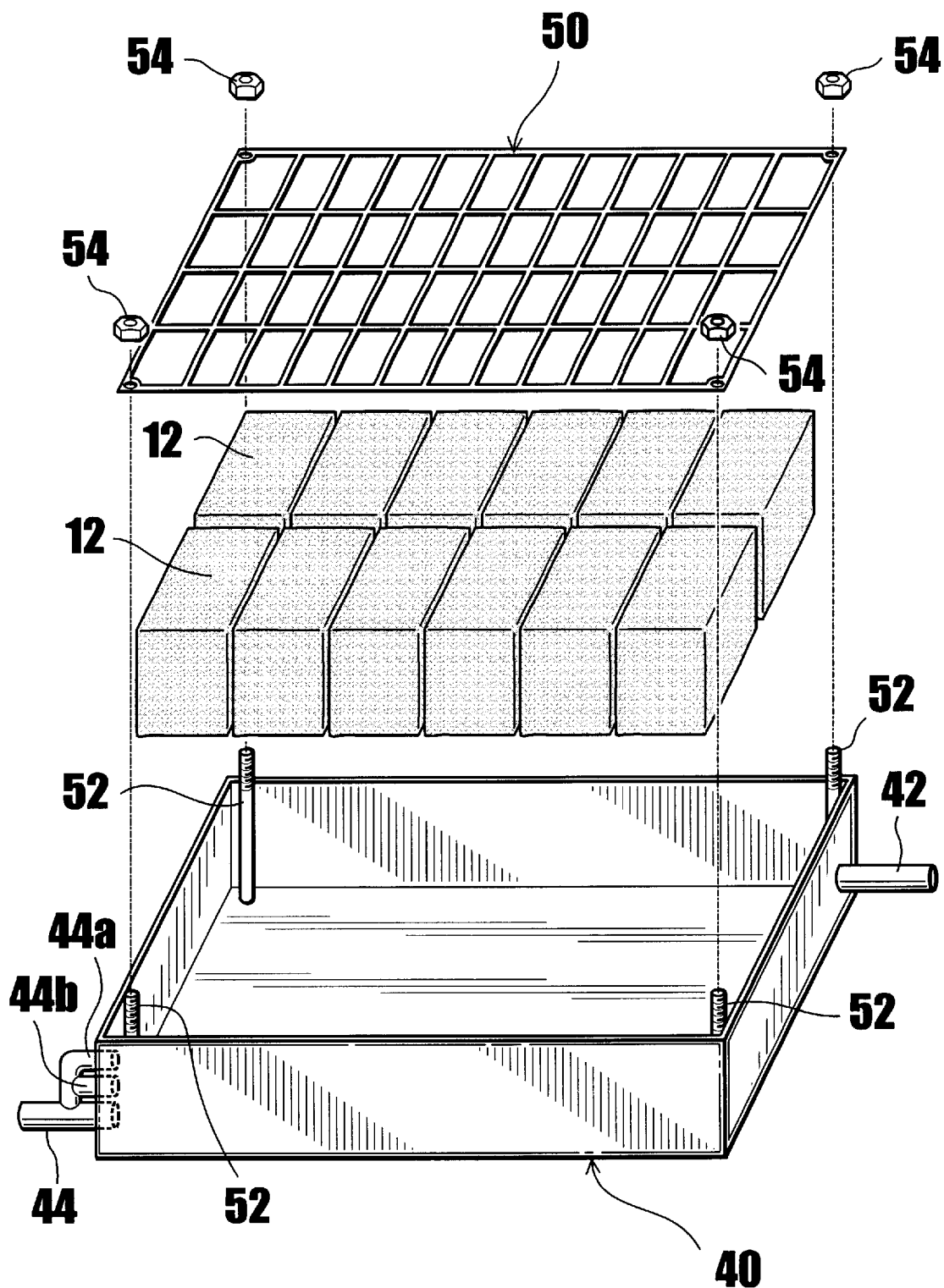

METHOD OF SAWDUST-BASED CULTIVATION OF SHIITAKE (*CORTINELLUS SHIITAKE*) AND A CULTIVATION WATER TANK USED FOR THE METHOD

This invention relates to a method of sawdust-based cultivation of Shiitake (Cortinellus Shiitake) and a cultivation water tank used for the method, and more particularly to a method of sawdust-based cultivation of Shiitake mushrooms having a high quality after finishing a sawdust-based sprouting of Shiitake, and a water tank used for the method.

BACKGROUND OF THE INVENTION

In the conventional method of sprouting mushrooms (Cortinellus Shiitake) in an open cultivation bed, there are two methods of promoting sprouting of mushrooms, either one of which is being carried out widely.

The first method called "A water sprinkling method" is a step of sprinkling much water for 1–3 hours every day to promote sprouting of mushrooms, in which mushrooms sprout little by little and sporadically for long hours.

According to the water sprinkling method, much water is required for pouring every day so that the juicy mushrooms thus cultivated contain as much as 95% water which cannot be preserved for long days.

The second method called "A water immersion method" comprises a step of immersing a cultivation bed in water as in the method of cultivating primordium in order to give a low temperature excitement to the cultivation bed for promoting sprouting of mushrooms.

The water immersion method is carried out repeatedly once in 20 and 30 days so that the concentrated sprouting of the mushrooms can be expected.

In accordance with the water immersion method, mushrooms of good quality and having a water content between 85%–90% can be obtained.

The water immersion method, however, has the disadvantage that water control of the exposed cultivation bed is very difficult, the cultivation bed is likely dried too much so as to deteriorate the next fruiting, activity of the naked cultivation bed, which is suffocated when immersed in water, is lowered to shorten life of the cultivation bed, and a fruit-body yield in one generation is very small.

In either method, Shiitake mushrooms sprout from the whole surface of the cultivation bed containing a sawdust-based substrate.

A number of the cultivation beds are arranged in one plane at equal spaces of several cm. –10 cm. from each other in order to avoid deformation of the neighboring mushrooms which are brought into contact with each other.

Accordingly, an accommodation density for the the cultivation beds in a cultivation chamber is small so that it is necessary to provide the cultivation chamber having a large space for accommodation.

Another method of preventing mushrooms from sprouting from a side portion of the cultivation bed has been proposed (see Japanese Patent Publication No.276.431/1988).

According to this method, a cylindrical bag made of synthetic resin film contains a cultivation substrate and a small opening provided on a top central surface of the substrate so that a top portion of the substrate is early matured, and a mycelial tunicat of the cultivation bed is exposed so as to allow the mushrooms to sprout only from the exposed mycelial tunicat of the cultivation bed.

In accordance with this method, no small opening is provided at a central portion of a middle and lower stages of the substrate so that maturing of the substrate at the middle and lower stages is delayed to prevent the mushrooms from sprouting from the side and bottom faces of the cultivation bed except from the exposed mycelial tunicat of the cultivation bed.

It is understood that mushrooms begin to sprout from the matured mycelial tunicat of the cultivation bed during the first and second sproutings, the middle and lower portions of the substrate mature due to its decomposition in a short time, thus forming several gaps between an inner periphery of the cylindrical bag and an outer sawdust-based substrate, primordiums sprout in the gaps and mushrooms grow from the side portion of the substrate in and after the third sprouting.

Accordingly, it is necessary to control the cultivation by removing a partial gap portion of the cylindrical bag in and after the third generation which causes the same troublesome control when the whole surface of the cultivation bed is exposed.

It is noted that this method is limited only to the sawdust-based substrate held in the cylindrical bag.

On the contrary, it is a recent tendency that a large cultivation bed for growing big mushrooms (a substrate having a weight between 2.5 Kg. –3 Kg.) and a rectangular cultivation bed enabling to increase accommodation for the cultivation bed are widely used.

In accordance with the rectangular cultivation bed, some gaps are originally formed on the side faces of the bed so that mushrooms grow on the side faces during the first fruiting, thus discontinuing only continuous fruiting from the exposed mycelial tunicat of the cultivation bed.

In consequence, the rectangular cultivation bed has not been widely adopted.

Even though it has the several disadvantages, the rectangular cultivation bed exposing all of the faces is widely used.

There is another method of growing mushrooms in which a portion of a cultivation bag containing a sawdust-based substrate is cut, water is poured into the cultivation bag and the mushrooms are grown only from an exposed mycelial tunicat of the cultivation bed (see Japanese Patent Publication No. 290387/1997).

Even if this method is superior to the conventionally total sprouting method in sprouting and growing only mushrooms from the exposed mycelial tunicat of a cultivation bed efficiently and continuously, the cost of equipment for controlling totally an cultivation bag increases, pinholes are likely and easily made through the cultivation bag, noxious insects such as mushroom flies grow in the bag in the later period of cultivation, and it is difficult to control equally the total cultivation bed.

SUMMARY OF THE INVENTION

A primary object of this invention is to provide an improved method of sawdust-based cultivation of Shiitake mushrooms (Cortinellus Shiitake) having a high quality after finishing a sawdust-based sprouting of Shiitake mushrooms.

Another object of this invention is to provide a method of sawdust-based cultivation of Shiitake mushrooms (Cortinellus Shiitake) whereby a cultivation bed containing a substrate is enclosed in a cultivation bag having a filter, after having finished sprouting a top portion of the cultivation bag is cut to expose a mycelial tunicat of the cultivation bed, the top portion of the cut cultivation bag is removed, a narrow gap is formed between the bag and the cultivation bed, water is poured into the gap to prevent mushrooms from growing from the side and bottom portions of the cultivation bed, and mushrooms are grown only from the mycelial tunicat of the cultivation bed.

Another object of this invention is to provide a method of sawdust-based cultivation of Shiitake mushrooms (Cortinellus Shiitake) whereby a top peripheral portion of the open cut cultivation bag is bound softly with an elastic band to narrow the gap between the cultivation bag and the cultivation bed for preventing mushrooms from growing from the side and bottom portions of the cultivation bed.

Another object of this invention is to provide a method of sawdust-based cultivation of Shiitake mushrooms (Cortinellus Shiitake) whereby cultivation is controlled in a temperature zone between 23 degree C. and 25 degree C. at least 3 days before finishing sprouting and/or at least 3 days after cultivation of mushrooms in order to give excitement to an exposed mycelial tunicat of the cultivation bed for preventing mushrooms from growing, and afterwards the temperature is lowered to a temperature zone between 10 degree C. and 20 degree C. to grow only mushrooms from a mycelial tunicat of the cultivation bed.

Another object of this invention is to provide a method of sawdust-based cultivation of Shiitake mushrooms (Cortinellus Shiitake) wherein a plurality of water tanks are horizontally mounted at regular intervals from each other in a multistage space frame, a number of cultivation beds are arranged closely in each water tank and a water solution is circulated through the cultivation tanks to prevent mushrooms from sprouting and growing from the side and bottom surfaces of the cultivation beds, but to sprout and grow only from an exposed mycelial tunicat of the cultivation beds.

Still another object of this invention is to provide a cultivation water tank for sawdust-based cultivation of Shiitake mushrooms which comprises a multistage space frame, a water sprinkler and an illuminator provided at a top portion of the space frame, a plurality of water tanks provided horizontally in the space frame at a longitudinally regular space from each other, each water tank including a number of cultivation beds closely arranged from each other, a water pipe provided at an upper portion of each water tank and a drain pipe pipe provided at a lower portion of the water tank whereby a water solution can be circulated through the circulation beds to prevent mushrooms from sprouting and growing from the side and bottom surfaces of the cultivation beds, but to sprout and grow only from an exposed mycelial tunicat of the cultivation beds.

DETAILED DESCRIPTION OF THE PREFERRED EMBODIMENT

This invention provides an improved method of and a water tank for sprouting and growing Shiitake mushrooms (Cortinellus Shiitake) for continuous growing of mushrooms in a cylindrical or square-shaped cultivation bed including a substrate whereby mushrooms can be continuously sprouted and grown only from an exposed mycelial tunicat of the cultivation bed for preventing mushrooms from growing from the side and bottom surfaces of the cultivation bed, but to grow only mushrooms from a mycelial tunicat of the cultivation bed.

Other features, advantages, and objects of this invention will become apparent with reference to the following description and accompanying drawing.

BRIEF DESCRIPTION OF DRAWINGS

FIG. 7 is a perspective view of a multistage water tank for growing mushrooms of this invention;

FIG. 10 is a exploded fragmentary perspective view; and

DETAILED DESCRIPTION OF A PREFERRED EMBODIMENT

EXAMPLE 1

Figure 1:
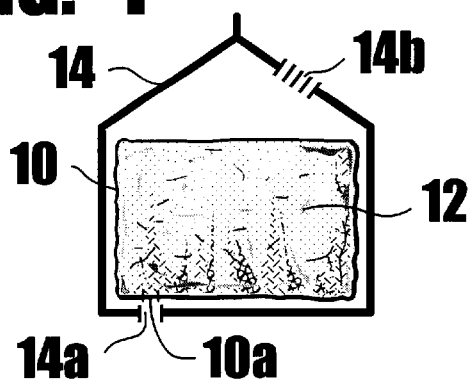
FIG. 1 is a longitudinally sectional view of a cultivation bed enclosed in a cultivation bag.
Figure 2:
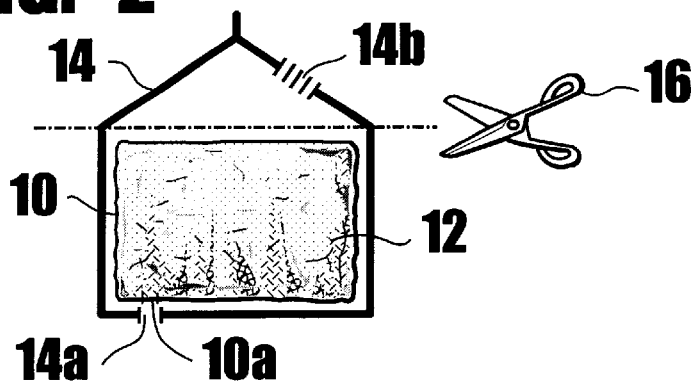
FIG. 2 is a similar longitudinal sectional view of FIG. 1 showing that a top portion of a cultivation bag being cut by a pair of scissors.
Figure 3:
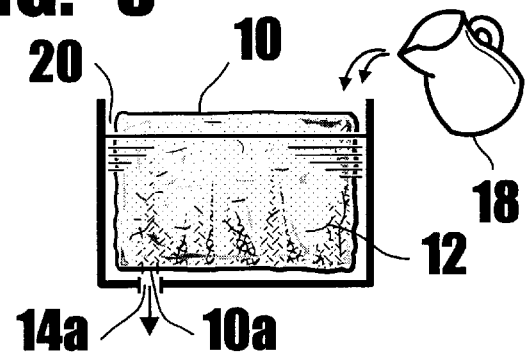
FIG. 3 is a similar longitudinal sectional view of FIG. 2 showing that water is being poured into a gap between a cultivation bag and a cultivation bed.

As shown in FIGS. 1–6, a square-shaped cultivation beds 10 measuring 12 cm. by 20 cm. by 17 cm. high, containing a sawdust-based substrate 12 weighing 2700 g. and having a weep hole 10a at a bottom plate was covered with a bag 14 of synthetic fiber sheet film such as polypropylene having a filter 14b at a top portion of the bag 14 was sterilized and cooled in a conventional method.

The cultivation bed 10 was inoculated with the mushroom spawn of [Hokken No. 600] and cultivated at a temperature of 20 degree C.±1 degree C. for 100 days.

A top portion of the cultivation bag 14 was cut by a pair of scissors 16.

Figure 6:
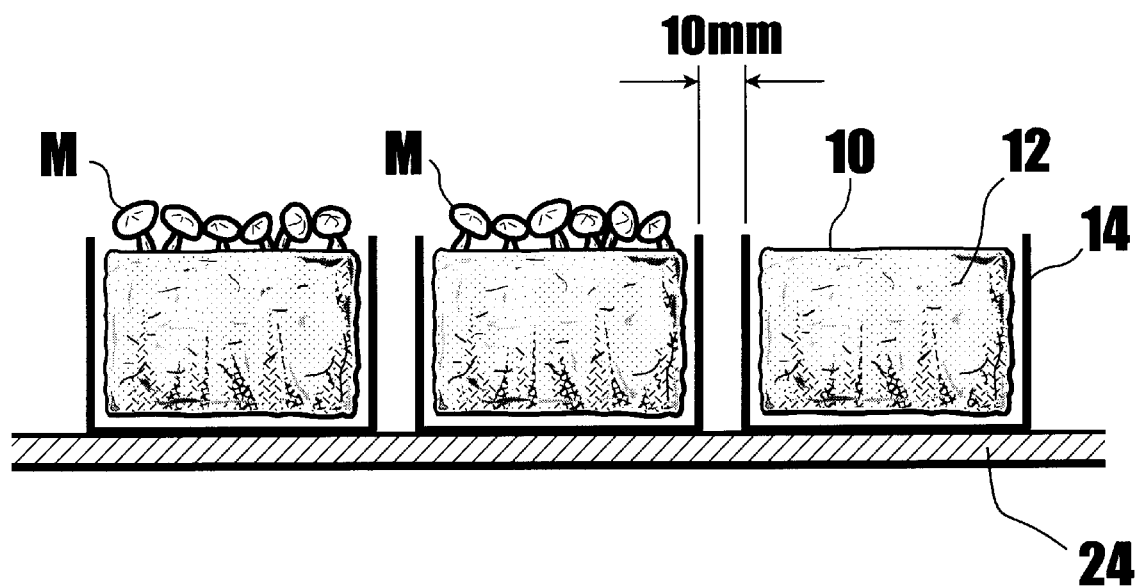
FIG. 6 is a longitudinal sectional view showing three cultivation beds are arranged on a plate to come close to each other and mushrooms have grown on the top surface of the cultivation bed.

As shown in FIG. 6, a plurality of the cultivation beds 10 were arranged on a plane with the space of 1 cm. from each other, water was poured into each gap 20 between an outer side of the bed 10 and an inner side of the bag 14 by a watering pot 18, and water was sprinkled once in three days to grow mushrooms.

EXAMPLE 2

The same cultivation bed 10 as that of EXAMPLE 1 was controlled at 20 degree C.±1 degree C. for 80 days, controlled at 25 degree C. between 81 days and 85 days, and a top portion of the bag was cut by a pair of scissors 16 at 25 degree C.

As shown in FIG. 6, a plurality of the cultivation beds 10 were arranged on a plane with the space of 1 cm. from each other, water was poured into each gap 20 between an outer side of the bed 10 and an inner side of the bag 14 by a watering pot 18, water was sprinkled once in a day and controlled for 15 days, and controlled at 20 degree C. and 25 degree C., totalling 100 days.

Afterwards, the temperature was lowered to 15 degree C., and water was sprinkled once in 3 days to grow mushrooms.

EXAMPLE 3

A weep hole 14a was provided through the cultivation bag 14 to locate at the weep hole 10a of the cultivation bed 10, and other conditions were controlled the same way as in the EXAMPLE 2 to grow mushrooms.

EXAMPLE 4

Figure 4:
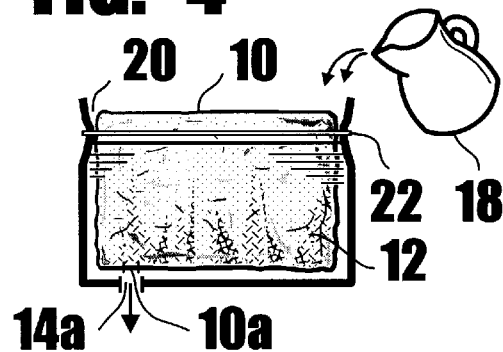
FIG. 4 is a similar longitudinal sectional view of FIG. 3 showing that a top peripheral portion is bound softly to reduce water pouring.
Figure 5:
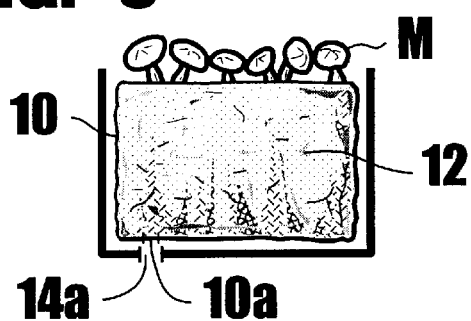
FIG. 5 is a longitudinal sectional view showing that the desired mushrooms have grown on the top surface of a cultivation bed.

As shown in FIG. 4, an upper peripheral portion of the cut portion of the cultivation bag 14 was bound softly by a rubber band 22 having a weak elasticity, and other conditions were controlled the same way as in the EXAMPLE 3 to grow mushrooms.

In view of the fact that the upper peripheral portion of the cut cultivation bag 14 was bound softly by the rubber band 22, the gap 20 between the outer side of the bed 10 and the inner side of the bag 14 was narrowed so that drying in the bed 10 was effectively prevented to increase activation of the total faces of the bed 10 and also to promote fruiting and growing of mushrooms.

CONTRAST EXAMPLE

The cultivation beds 10 were cultured at 20 degree C.±1 degree C. for 100 days, all of the cultivation bags 14 were taken out, and subsequently the cultivation beds 10 were arranged on a plane with a space of 10 cm. from each other.

Afterwards, the temperature was lowered to 15 degree C., the first fruiting and growing of the mushrooms were carried out effectively, a water immersion control was carried out as long as 3 hours to have the second fruiting and growing of the mushrooms.

The result is shown in the following TABLE 1.

TABLE 1

| | Number of test | Number of sprout of one cultivation bed per one generation | | | | Average number of mushroom | Average growth number |
|---|---|---|---|---|---|---|---|
| | | Upper face | Side face | Bottom face | Total | | |
| Example No. | | | | | | | |
| 1 | 1000 | 41 | 8 | 0 | 49 | 24 g. | 1176 g. |
| 2 | 1000 | 47 | 1 | 0 | 48 | 24 g. | 1152 g. |
| 3 | 1000 | 55 | 1 | 0 | 56 | 23 g. | 1288 g. |
| 4 | 1000 | 58 | 0 | 0 | 58 | 23 g. | 1334 g. |
| Contrast Example | 1000 | 13 | 68 | 11 | 92 | 12 g. | 1104 g. |

The number of fruiting of mushrooms from a mycelial tunicat of the cultivation bed of the foregoing examples increased remarkably in comparison to the CONTRAST EXAMPLE and its fruit-body yield was high.

As apparent from the foregoing CONTRACT EXAMPLE, the fruiting ratio of mushroom from a mycelial tunicat became higher from EXAMPLES 1, 2, 3 and 4 in order.

A lot of good, expensive and voluminous mushrooms, each having an average weight between 23–24 g. about twice as heavy as 12 g. of a mushroom obtained in the contrast example, could be obtained.

In addition, harvesting of mushrooms became time-saving and a total weight of the obtained mushrooms increased to gain a high profit.

EXAMPLE 5

It should be appreciated that the cultivation environment of the foregoing examples was controlled by an air conditioner, and that it can be applied to a natural cultivation as well.

The same cultivation bed 10 as that of EXAMPLE 1 was prepared from winter to spring and the cultivation was carried out in a natural environment.

A top portion of the cultivation bag 14 having a weep hole 14a was cut in a high temperature period exceeding over 25 degree C. water was sprinkled into the cultivation bed 10 once in a day in a manner that water stayed in a gap between the cultivation bag 14 and the cultivation bed 10, and the stayed water could be exhausted through the weep holes 10a and 14a.

Having carried out the cultivation under the above control until the temperature falls in autumn, sprouting of mushrooms could be observed only from a top portion of the cultivation bed 10 when the lowest temperature drops below 15 degree C.

In the contrast example, all of the cultivation bags 14 were taken out from the cultivation beds 10 at a high temperature period, water control was carried out with a bare cultivation bed, and the mushrooms grew from the total surface of the cultivation beds at the same sprouting period.

The result is shown in the following TABLE 11.

TABLE 11

| | Number of test | Number of sprout of one cultivation bed per one generation | | | | Average number of mushroom | Average growth number |
|---|---|---|---|---|---|---|---|
| | | Upper face | Side face | Bottom face | Total | | |
| Example No. 5 | 1000 | 56 | 4 | 0 | 60 | 22 g. | 1320 g. |
| CONTRAST EXAMPLE | 1000 | 13 | 68 | 11 | 92 | 12 g. | 1104 g. |

In comparison to the CONTRAST EXAMPLE, the number of the mushrooms sprouting from the top portion of the cultivation bed increases and its yield is very high.

In addition, the voluminous mushroom of good quality and having an average weight can be obtained as compared to that shown in the CONTRAST EXAMPLE.

As described in the foregoing paragraphs, the top surface of the cultivation bed is exposed to fresh air, the primordium in the top surface of the cultivation bed grow into the mushrooms in a proper environment, and the primordium in the side and bottom faces are brought into contact with water in the gap between the cultivation bag 14 and the cultivation bed 10 in order to restrain the mushrooms from growing from the side and bottom faces of the cultivation bed 10.

As shown in FIG. 4, a top peripheral portion of a cultivation bag 14 is bound softly by a rubber ring 22 in order to reduce the space between the gap between the cultivation bag 14 and the cultivation bed 10.

When the side and bottom faces of the cultivation bed 10 are made into contact with water for long hours, some portion becomes watery locally, and excessive water is exhausted through the weep holes 10a and 14a, thus enabling to replace the water with open fresh air intermittently.

Excessive water can be exhausted quickly through the weep holes 10a and 14a so that it becomes possible to pour water directly from an upper portion of the cultivation bed 10 into the gap between the side portion of the cultivation bed 10 and the cultivation bag 14.

It should be appreciated that a quantity of water sprinkled into the cultivation bed 10 is sufficient enough to fill only the gap between the side portion of the cultivation bed 10 and the cultivation bag 14 temporarily, and it it not necessary to sprinkle much water.

The side and bottom faces of the cultivation bed 10 is surrounded with the cultivation bag 14 so that it is possible to maintain much water content without causing over drying of the cultivation bed 10.

Accordingly, the water stayed in the gap between the cultivation bed 10 and the cultivation bag 14 is replaced with the fresh air intermittently in order to activate healthy growing of mushroom fruitings, to maintain a proper water content in the cultivation bed 10 and to grow the good mushrooms continuously and effectively from the top surface of the cultivation bed 10.

It is to be understood that when a part of a cultivation bag 14 is partially removed to expose a top surface of a cultivation bed 10, excitement is given to primordium at a side surface of the cultivation bed 10, water is poured into a gap between the cultivation bag 14 and the cultivation bed 10 to inhibit primordium from growing, and inhibition is stronger than excitement.

When the top surface of the cultivation bed 10 is exposed to air after it has been moved, there is a strong possibility that mushrooms come out due to excitement of vibration caused by strong movement.

In order to carry out a positive inhibition, the temperature is controlled in a range between 23 degree C. and 35 degree C. from at least 3 days prior to finishing of cultivation, subsequently a part of the cultivation bag 14 is cut out to expose a top surface of the cultivation bed 10, water is poured into the gap between cultivation bag 14 and the cultivation bed 10, and afterwards the temperature is controlled in a range between 23 degree C. and 35 degree C. for more than 3 days.

Accordingly, the cultivation bed 10 is put into the temperature range that mushrooms cannot come out easily, and a temporary open excitement given by exposing the top surface of the cultivation bed 10 may avoid sprouting and growing of the mushrooms.

In addition, when the temperature is lowered into a range between 10 degree C. and 20 degree C., the mushrooms may grow again only from the top surface of the cultivation bed 10 as desiredly.

Figure 9:
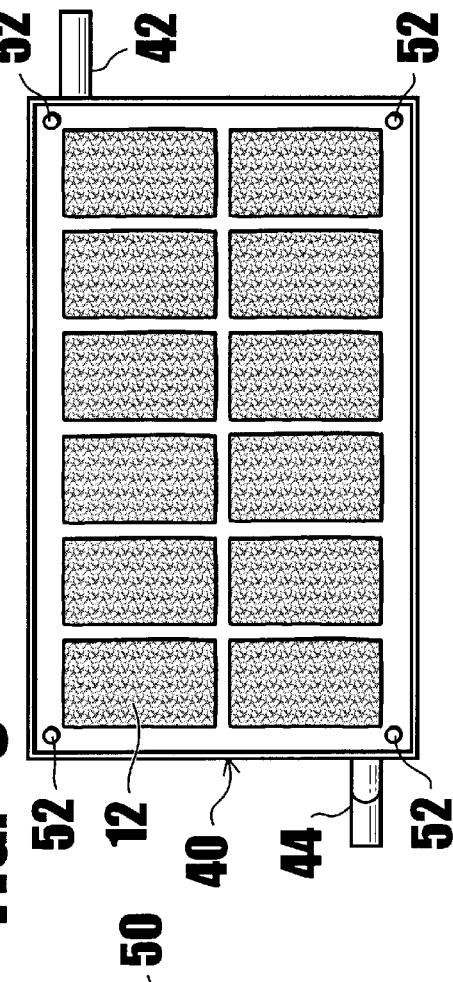
FIG. 9 is a number of cultivation beds arranged on a rack in FIG. 8.
Figure 8:
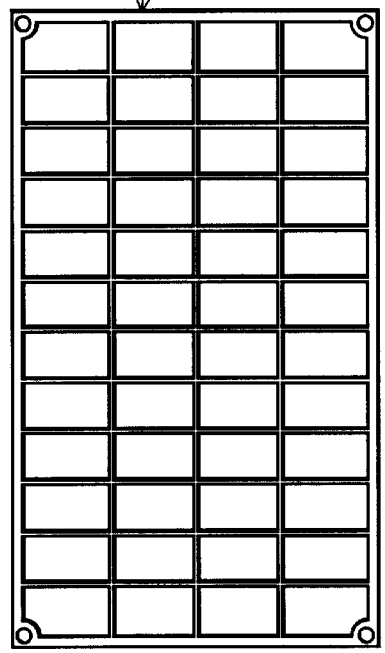
FIG. 8 is a plan view of a rack shown in FIG. 7.

In FIGS. 8–10, a cultivation water tank 40 is shown, in which a rectangular container made of stainless steel measuring measuring 43 cm. by 68 cm. by 20 cm. includes a water pipe 42 provided through an upper portion of one side plate and a drain pipe 44 provided through a lower portion of another side plate of the water tank 40 respectively.

In FIG. 7, a latticed frame 50 made of stainless steel having a size to be fitted like a lid into the water tank 40 is detachably and adjustably inserted into an upper portion of the water tank 40 and fixed by a plurality of bolts 52 and nuts 54.

The latticed frame 50 can be detachably and adjustably inserted into an upper portion of the water tank 40 by any other means.

As particularly shown in FIGS. 7 and 8, three water tanks 40 are horizontally arranged into a framework 30 at equal intervals, a plurality of water sprinklers 32, an air blower 34 and a pair of illuminators 36 are provided at each water tank 40 (these equipments are illustrated at the top water tank 40, but they are not shown in the middle and lower water tanks 40).

With reference to FIGS. 7–11, a sawdust-based substrate 12 weighing 2700 g. and measuring 20 cm. by 12 cm. by 17 cm. was sterilized and cooled in a conventional method.

The sawdust-based substrate 12 was inoculated with the mushroom spawn of [Hokken No. 600] and cultivated at a temperature of 20 degree C.±1 degree C. for 80 a period between 81 and 85 days.

As shown in FIG. 9, twelve pieces of sawdust-based substrates 12 were arranged in the water tank 40 at equal intervals of 1 cm. from each other and with their top surfaces open.

Subsequently, a latticed frame 50 shown in FIG. 8 was fixed on the water tank 40 to press the sawdust-based substrates 12.

Figure 11:
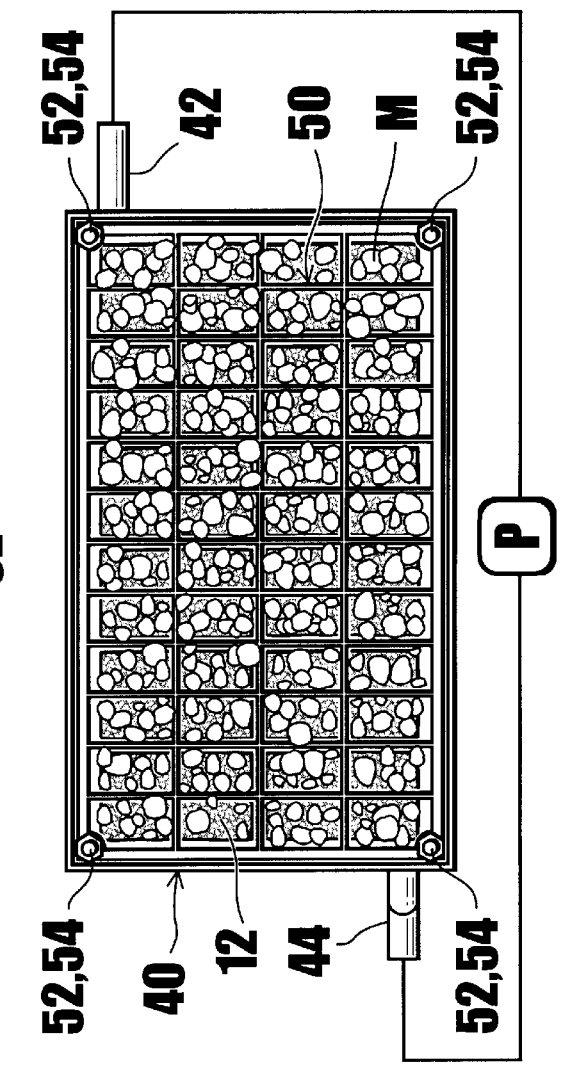
FIG. 11 is a modified plan view of a FIG. 7.

As shown in FIG. 11, a pump P was connected to the water pipe 42 and the drain pipe 44 through a circulating pipe, and as particularly shown in FIG. 7, a pair of exhaust pipes 44a, 44b are provided at the drain pipe 44 so that water may not overflow onto the top surface of the sawdust-based substrate 12.

Through an operation of the pump P, a water solution was circulated through the water tank 40 in a manner that the water solution might not overflow the top surface of the sawdust-based substrate 12 at a temperature of 25 degree C. for 14 days.

During the operation, water was sprayed on the top surface of the sawdust-based substrate 12 once in a day through the water sprinklers 32 and the air blower 34.

Afterwards, the temperature of the circulating water solution was lowered into 15 degree C., water was sprinkled once in 3 days, and mushrooms M were allowed to sprout and grow from the top surface of the sawdust-based substrate 12.

It is liable that a volume of the sawdust-based substrate 12 reduces gradually so as to float itself so that it is necessary to adjust a height of the latticed frame 50 for continuing a pressing effect thereof.

The temperature in the water tank 40 is maintained around 20 degree C. when sprouting of the mushrooms is not observed or it is insufficient, and it is maintained around 13 degree C when sprouting of the mushrooms is observed.

A comparison between the foregoing sprouting EXAMPLE of this invention, the result of CONTRAST EXAMPLE (TABLE 1) of sprouting mushrooms by totally exposing a top surface of a cultivation bed and the the result of CONTRAST EXAMPLE (TABLE 11) of sprouting mushrooms by totally exposing a top surface of a cultivation bed and pouring water into a gap between a cultivation bag and a cultivation bed is shown in the following TABLE 111.

TABLE 111

| | Number of test (Cultivation bed) | Number of sprout of one cultivation bed | | Average weight of mushroom (g.) |
|---|---|---|---|---|
| | | Number of sprout | Quantity of sprout (g.) | |
| CONTRAST EXAMPLE No. 1 | 12 | 75 | 900 | 12 |
| CONTRAST EXAMPLE No. 2 | 12 | 48 | 1248 | 26 |
| EXAMPLE | 12 | 55 | 1430 | 26 |

As apparent from the foregoing descriptions, it is possible to harvest excellent and voluminous mushrooms M only from the top surface of the cultivation bed 12 by the CONTRAST EXAMPLE No. 2 and EXAMPLE in comparison to the mushrooms M grown by the cultivation method of sprouting mushrooms by exposing the total surface of the cultivation bed 12 described in the CONTRAST EXAMPLE No. 1.

At the same time, it becomes possible to save time of harvesting mushrooms which can be sold at a high price, and its total quantity of the mushrooms is very high.

Having compared the CONTRAST EXAMPLE No. 2 with the EXAMPLE, a water solution matching with the cultivation bed 12 can be circulated through each water tank 40 independently at constant temperature, thus enabling to adjust and control the water content (nutriment) with the mushrooms and also increasing the quantity of the grown mushrooms.

Even if the temperature in the room is lowered when the mushrooms are fruiting, the temperature around the side faces of the cultivation bed 12 is not lowered so that there occur no fruiting of mushrooms from the side faces, the temperature in the room where the mushrooms fruiting from the top surface of the cultivation bed 12 can be controlled at an optimum temperature, and the quality of the mushrooms can be improved remarkably.

In comparison to the CONTRAST EXAMPLE 111 in which it is necessary to control the total environmental conditions of the fruiting and growing of the mushrooms, the cost of plant and equipment of the method of this invention is very small and the harvesting will not take much time.

Accordingly, the method and device of this invention enable those skilled in the art to carry out effective, continuous and mass production of mushrooms of good quality.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method of sawdust-based cultivation of Shiitake (Cortinellus Shiitake) comprising:
    covering a square-shaped cultivation bed containing a sawdust-based substrate and having a weep hole at a bottom surface, with a bag of synthetic fiber sheet film;
    sterilizing and cooling said bag by a conventional method;
    inoculating said cultivation bed with mushroom spawns after having finished sawdust-based cultivation of Shiitake primordium;
    cutting only a top portion of said bag containing said sawdust-based substrate to expose a top surface of said sawdust-based substrate;
    forming a gap between the bag and the cultivation bed;
    pouring water into said gap in order to restrain primordium from fruiting from side and bottom faces of said sawdust-based substrate; and
    allowing said primordium to fruit and grow only from the top surface of said sawdust-based substrate.

2. A method of sawdust-based cultivation of Shiitake (Cortinellus Shiitake) as claimed in claim 1, further comprising:
    binding softly an upper peripheral portion of the cut portion of the bag by a rubber band in order to narrow the gap between said bag and the cultivation bed.

3. A method of sawdust-based cultivation of Shiitake (Cortinellus Shiitake) as claimed in claim 1, further comprising:
    controlling the temperature in a range between 23 degree C. and 35 degree C. for a period of at least 3 days before finishing the cultivation of primordium and/or for a period of 3 days after controlling fruiting step in order to refrain mushrooms from growing by giving an open excitement applied on the exposed top surface of the cultivation bed; and subsequently,
    lowering the temperature into a range between 10 degree C. and 20 degree C. in order to grow effectively mushrooms only from the top surface of the cultivation bed.

4. A method of sawdust-based cultivation of Shiitake (Cortinellus Shiitake) as claimed in claim 1, further comprising:
    providing a drain through a bottom portion of the bag;
    repeating intermittently water supply into the gap when the water in said gap is decreased by a natural loss, and also supplying air into said gap after said water has been substantially exhausted.

5. A method of sawdust-based cultivation of Shiitake (Cortinellus Shiitake) comprising:
    inoculating a sawdust-based substrate in a cultivation bag with mushroom spawns;
    taking away the cultivation bag from the sawdust-based substrate in a sprouting step after finishing cultivation at equal intervals from each other;
    arranging a number of said sawdust-based substrates into a cultivation water tank at equal intervals;
    arranging a plurality of said cultivation water tanks horizontally at equal intervals from each other in a framework with their top surfaces open,
    supplying a water solution into each cultivation water tank, in a manner that said water solution may not overflow onto the top surfaces of the sawdust-based substrates, in order to refrain mushrooms from fruiting and growing from the side and bottom faces of said sawdust-based substrates; and
    promoting fruiting and growing of mushrooms only from the top surfaces of said sawdust-based substrates.

6. A method of sawdust-based cultivation of Shiitake (Cortinellus Shiitake) as claimed in claim 5, wherein said water solution is circulated through each of the cultivation water tanks.

7. A method of sawdust-based cultivation of Shiitake (Cortinellus Shiitake) as claimed in claim 5, wherein the temperature of said water solution is controlled into a range over or under a fruiting temperature of mushrooms in order to refrain the mushrooms from fruiting and growing from the side and bottom faces of said sawdust-based substrate by applying an excitement on the top surface of said sawdust-based substrate, and subsequently the temperature is adjusted into a range for promoting fruiting of mushrooms.

8. A method of sawdust-based cultivation of Shiitake (Cortinellus Shiitake) as claimed in claim 5, wherein a component of said water solution filled in said cultivation water tank may be changed in accordance with the conditions of said sawdust-based substrate in order to refrain or promote mushrooms from fruiting and growing.

\* \* \* \* \*